United States Patent [19]

Starr

[11] Patent Number: 5,009,287

[45] Date of Patent: Apr. 23, 1991

[54] VEHICLE LIFT

[75] Inventor: George N. Starr, Memphis, Tenn.

[73] Assignee: Delaware Capital Formation, Inc., Wilmington, Del.

[21] Appl. No.: 409,438

[22] Filed: Sep. 19, 1989

[51] Int. Cl.[5] .................... B60S 13/00

[52] U.S. Cl. .................... 187/8.41; 187/95; 254/89 R

[58] Field of Search .................... 187/8.41, 8.43, 8.45, 187/8.47, 9 R, 9 E, 95, 8.67, 8.75; 254/89 R; 52/721; 414/628, 630

[56] References Cited

U.S. PATENT DOCUMENTS

| | | | |
|---|---|---|---|
| 3,414,086 | 12/1968 | Ulinski | 187/95 |
| 4,763,761 | 8/1988 | McKinsey et al. | 187/8.41 |

OTHER PUBLICATIONS

Gilbarco GFF-70—Brochure of Gilbarco (4 pages).

Grand Lifts Twin Post—Brochure of Grand, Incorporated (4 pages).

Challenger2Plus—Brochure of VMB Corporation (4 pages).

The Two Poster 90—Brochure of Weaver Corporation (2 pages).

The Chiefs Lifts—Brochure of Western Manufacturing Co. (4 pages).

Werther 252—Brochure of Werther International (4 pages).

Hebebuhnen Lifts—Brochure of Paul Lange and Co. (6 pages).

Hofmann—Brochure of Hofmann Werkstatt-Technik GmbH (8 pages).

Success In Motion—Brochure of Stertil-Koni (4 pages).

JAB TwinLift—Brochure of J. A. Becker and Sohne (8 pages).

*Primary Examiner*—Robert P. Olszewski
*Assistant Examiner*—Kenneth Noland
*Attorney, Agent, or Firm*—Walker & McKenzie

[57] ABSTRACT

A lift for vehicles in service stations, repair centers and the like to lift such vehicles for the repair and servicing thereof. The vehicle lift includes a support for engaging the vehicle to be lifted, a power cylinder for lifting, supporting and lowering the support, and a pair of vertically extending columns for supporting and guiding the support during lifting, supporting and lowering of the vehicle. The columns include a first pair of channels inwardly facing towards one another and a second pair of channels integrally attached to the first pair and outwardly opening away from one another for balancing the rotating forces on the inwardly facing channels.

11 Claims, 2 Drawing Sheets

VEHICLE LIFT

BACKGROUND OF THE INVENTION

1. Field of the Invention

The present invention relates, in general, to lifts having vertical columns in which lift arms are supported in cantilever fashion therefrom and which lift arms in turn act as supports for vehicles in service stations, repair centers and the like to lift such vehicles for the repair and servicing thereof.

2. Information Disclosure Statement

Heretofore, such lifts for each of the columns have typically utilized a single channel or a pair of channels inwardly opening towards one another with each of the columns being supported at the lower end thereof on a supporting surface and extending vertically upwardly from the supporting surface. In each of the columns follower means in the form of either one or more rollers or one or more blocks move in the channels. The follower means are operatively connected to one or more lift arms to hold the arm(s) in cantilever fashion relative to the column as the lift arm(s) is/are moved upwardly, downwardly or is/are held in any given position. Also, typically the rollers or blocks are in pairs, i.e., an upper pair and a lower pair. The lower rollers or blocks roll or slide against the web or back of the channel and the upper rollers or blocks load the flanges of the channel with an outward pulling or shear force against the flanges in a direction away from the web of the channel tending to bend the flanges outwardly and cause problems such as the outward bulging of the flanges with the eventual possibility of the rollers or blocks pulling out of the channel causing the lift arm to fall. Thus, a dangerous situation could occur with the consequent injury to personnel and damage to the vehicle.

After the present invention was conceived by me, it was brought to my attention that in another field, i.e., the conveyor field, a configuration for the tracks for trolleys in overhead conveyors was in existence somewhat similar to the column configuration of the columns in my invention. However, I do not believe that it is an analogous art. Further, I do not believe that a person skilled in the vehicle lift field would look to the conveyor field for suggestions, and the problems are different in the two fields. Thus, in the field of the present invention the vehicle lifts utilize a cantilever effect on a vertical column supported vertically only at the base thereof with the shear forces acting on the column in a horizontal direction, with the forces acting on the upper set of rollers or blocks tending to pull the column in one direction and the forces acting on the lower set of rollers pushing in the opposite direction. In contrast, in an overhead trolley system the track is held horizontal at spaced points along the length thereof and the forces are vertical forces from the trolley acting downwardly on the track. Also, in the conveyor field there is no concern about any upward force acting against the web of the track, whereas in the vehicle lift field the web should be flat since the lower rollers or blocks are bearing thereagainst.

SUMMARY OF THE INVENTION

The present invention is directed toward providing an improved vehicle lift for use in service stations, repair centers and the like to lift such vehicles for the repair and servicing thereof.

The vehicle lift of the present invention includes, in general, support means for engaging a vehicle to be lifted; the support means including at least one carriage means and lift arm means, the carriage means including at least one follower means; power means engaging the support means for lifting, supporting and lowering the support means to lift, support and lower a vehicle engaged by the support means; and at least one vertically extending column means for supporting and guiding the support means during the lifting, supporting and lowering thereof; the column means including at least a first channel means opening inwardly towards said carriage and at least a second channel means joined to said first channel means and opening outwardly in the opposite direction from said first channel means, with the follower means being movably received in the first channel.

One of the objects of the present invention is to provide means for substantially balancing the rotating effect of the follower means on the column means in the vehicle lift of the present invention whereby the tendency of the flanges of the column means of the vehicle lift of the present invention to bulge and open up is substantially eliminated.

Another object is to provide such a column means which is stronger and more reliable.

A further object is to provide an improved vehicle lift which is safer to use.

A further object is to provide means for overcoming the shear center problem of the columns of vehicle lifts caused by the load not being in line with the shear center of the columns.

A further object is to improve the design and construction of vehicle lifts.

DESCRIPTION OF THE PREFERRED EMBODIMENT

Figure 1:
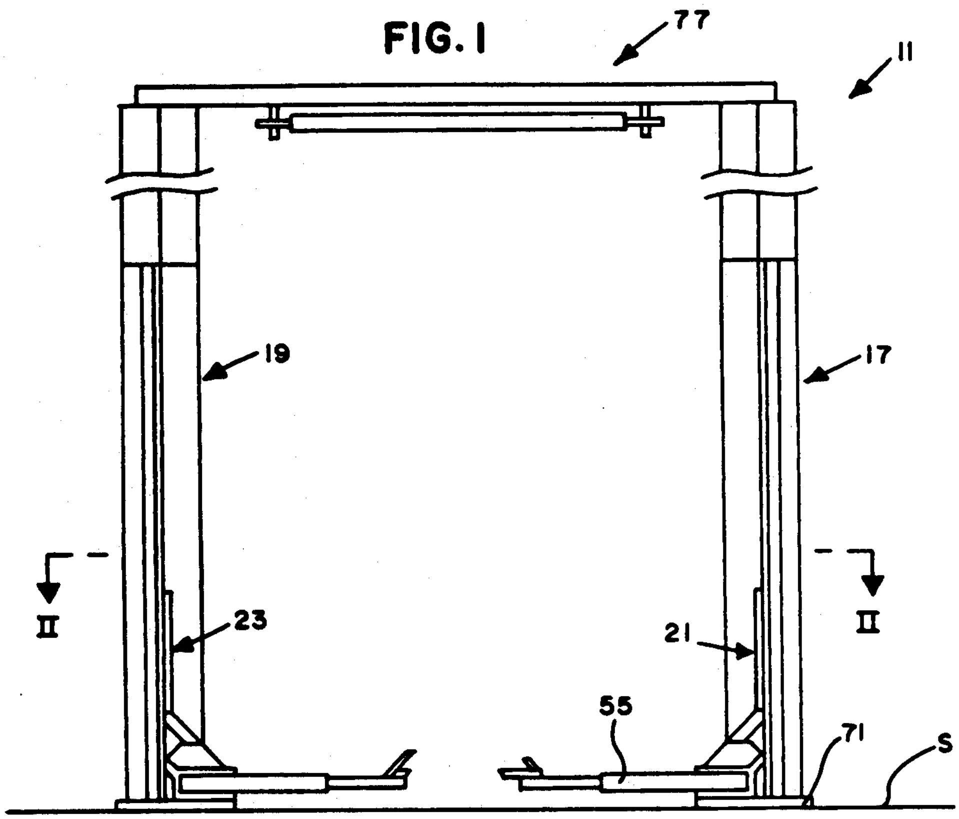
FIG. 1 is a front elevational view of the vehicle lift of the present invention.

The preferred embodiment of the present invention is shown in conjunction with a type of vehicle lift known as an asymmetrical vehicle lift with an overhead cable equilization for providing an unobstructed floor surface. However, it will be understood that the present invention may be utilized with other types of vehicle lifts without departing from the spirit and scope of the present invention.

The vehicle lift 11 of the present invention comprises, in general, support means 13 for engaging a vehicle, not shown, to be lifted, supported, and lowered, power means 15 engaging support means 13 for lifting, supporting and lowering support means 13 to lift, support and lower a vehicle engaged by support means 13, a first vertically extending column 17 and a second vertically extending column 19 for supporting and guiding support means 13 during the lifting, supporting and lowering thereof.

Support means 13 preferably includes a first carriage 21 and a second carriage 23, and a first lift arm means 25 and a second lift arm means 27 respectively associated with first carriage 21 and second carriage 23.

Power means 15 preferably includes a first power assembly 29 associated with first carriage 21 and a second power assembly 31 associated with second carriage 23.

First carriage 21 and second carriage 23, first lift arm means 25 and second lift arm means 27, and first power assembly 29 and second power assembly 31, which are respectively associated with first column 17 and second column 19 along with the following parts associated with the respective columns 17, 19 are substantially identical, and the following detailed description of first column 17 and its related parts will suffice for both.

First column means 17 includes a first portion 33, a second portion 35 spaced from first portion 33, and a back portion 37 integrally joining first and second portions 33, 35 along the respective edges of first and second portions 33, 35 respectively adjacent the edges of back portion 37.

Each of portions 33, 35 includes a first channel 39 with the first channels 39 of the first and second portions 33, 35 opening inwardly towards one another. In addition each of first and second portions 33, 35 include a second channel 41 integrally joined to first channel 39 and opening outwardly in the opposite direction from first channel 39. First channels 39 of first and second portions 33, 35 are opposite and open towards one another. Second channels 41 of first and second portions 33, 35 are opposite and open away from one another.

Each of first channels 39 of first and second portions 33, 35 includes an outer flange 43, an inner flange 45 spaced from outer flange 43, and a web 47 integrally joining inner and outer flanges 43, 45 along the side edges of the web 47 respectively with the side edges of outer and inner flanges 43, 45. The inner flanges 45 of first and second channels 39, 41 are integrally joined as best seen in FIG. 3 to respectively establish one piece common to both channels, i.e., to establish an intermediate flange 49 of first portion 33 and an intermediate flange 49 of second portion 35, but it will be understood that inner flanges 45 may actually be two separate flanges of the respective channels 39, 41 which are joined together in flat face to face relationship and fixedly attached as by welding or the like to establish a composite intermediate flange, without departing from the spirit and scope of the present invention.

Figure 3:
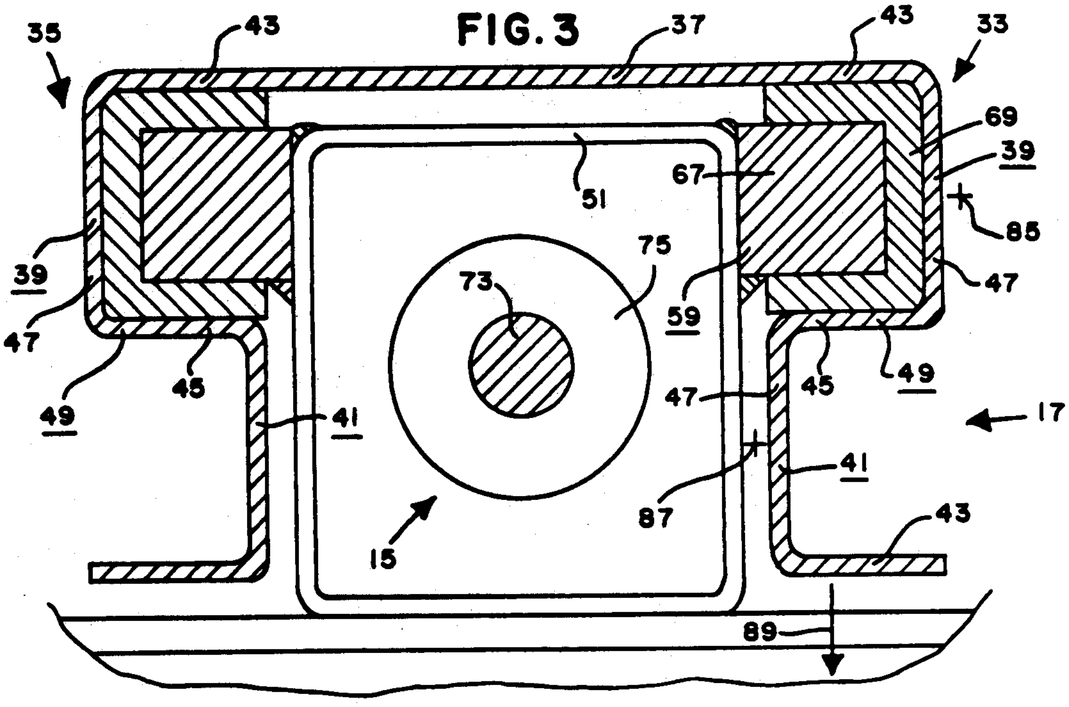
FIG. 3 is an enlarged fragmentary view of a portion of that shown in FIG. 2.
Figure 4:
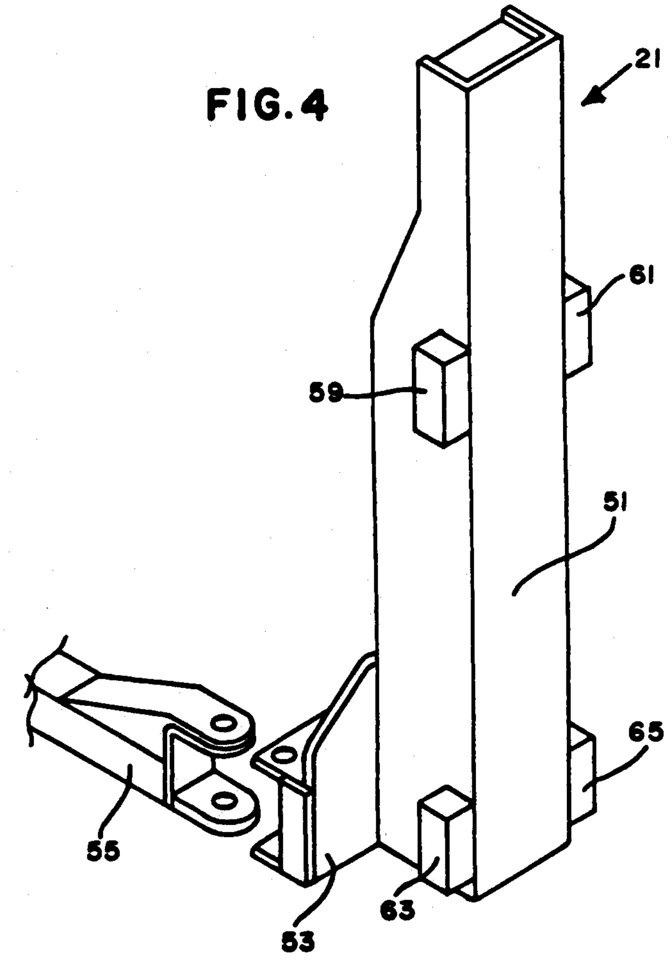
FIG. 4 is a perspective exploded view of a portion of the support means of the vehicle lift of the present invention.
Figure 5:
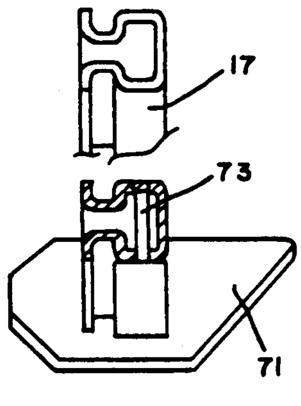
FIG. 5 is a perspective view of one of the column means of the vehicle lift of the present invention.

The outer flanges 43 of first and second channels 39 are preferably integrally joined by extensions thereof as best seen in FIG. 3 to establish a back portion 37 of first column 17.

Figure 2:
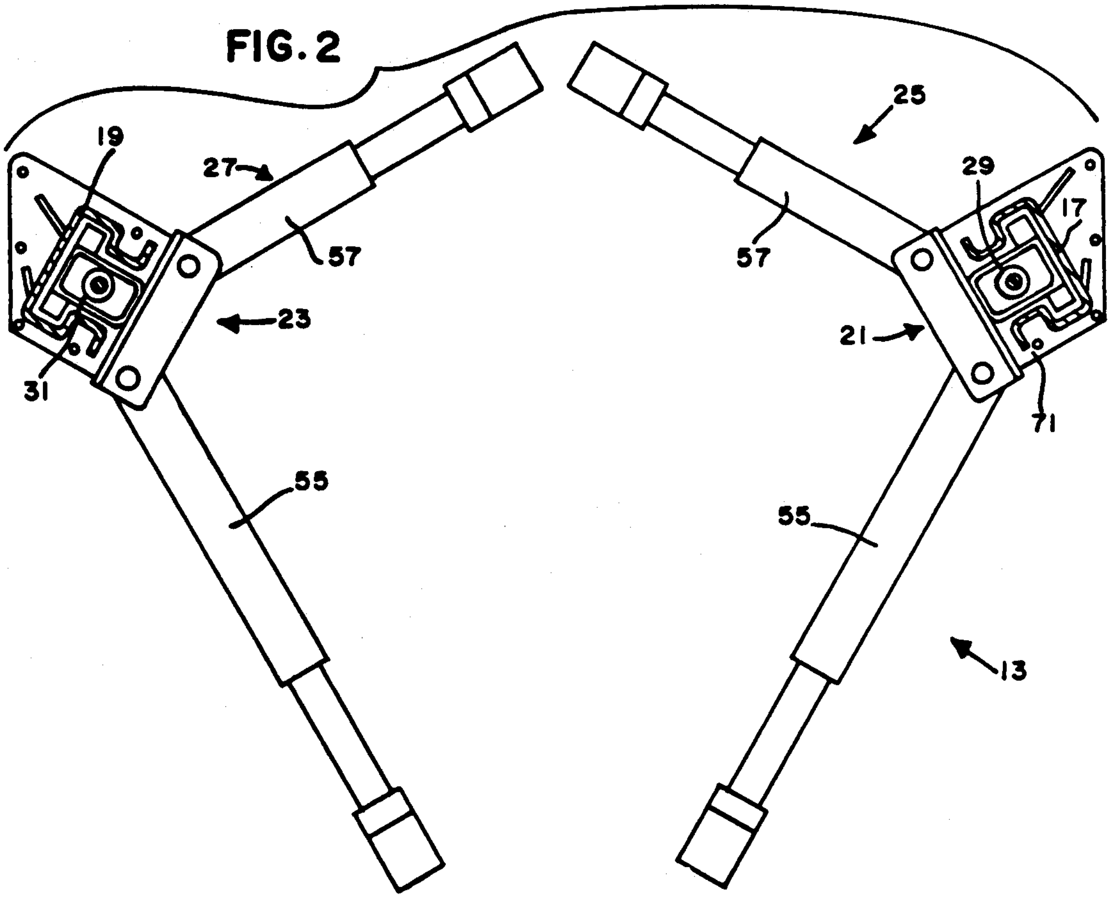
FIG. 2 is an enlarged plan view of the vehicle lift of the present invention taken as on the line II—II of FIG. 1.

Carriage 21 preferably includes a vertically extending four sided hollow tube 51, and a yoke 53 fixedly attached thereto to swingably support first lift arm means 25 in a manner well known to those skilled in the art. In the asymmetrical lift illustrated, first lift arm means 25 preferably includes a first lift arm 55 and a second lift arm 57, well known to those skilled in the art. Also, as is known by those skilled in the art, an asymmetrical lift has its columns facing generally towards one another but at an angle, as best seen in FIG. 2.

First carriage 21 is movably mounted on column 17 by follower means for vertical movement of first carriage 21 relative to column 17, with the follower means preferably comprising upper followers 59, 61 and lower followers 63, 65. Upper follower 59 is fixedly attached to carriage tube 51 on one side thereof adjacent an upper portion of tube 51 and upper follower 61 is fixedly attached to tube 51 on the opposite side of tube 51 from upper follower 59 at the same height as upper follower 59. Lower follower 63 is fixedly attached to one side of tube 51 adjacent the lower portion of tube 61 and spaced below upper follower 59. Lower follower 65 is fixedly attached to the opposite side of tube 51 from lower follower 63 below upper follower 61 and at the same relative position as lower follower 63.

Each of the followers 59, 61, 63, and 65 are preferably identical and the following description of upper follower 59 and its attachment to tube 51 will suffice for a description of all the followers.

Upper follower 59 preferably includes a block 67 fixedly attached to tube 51 as by welding or the like and preferably includes a cap 69 formed of ultra high molecular weight polyethylene which fits around the top, bottom, sides and end of block 67 with the cap 69 slidably contacting the interior of first channel 39 of first portion 33 as best seen in FIG. 3. It will be understood that a roller may be utilized to rollingly contact first channel 39 without departing from the spirit and scope of the present invention, as now will be understood by those skilled in the art.

In addition to upper follower 59 being slidably received in first channel 39 of first portion 33, the lower follower 63 will also be received in this first channel 39, and upper follower 61 and lower follower 65 will be slidably received in first channel 39 of second portion 35.

First column 17 is vertically mounted at its lower end from a supporting surface S by suitable means well known to those skilled in the art, such as a base plate 71 secured to the lower end of first column 17 and to supporting surface S by suitable means well known to those skilled in the art.

First power assembly 29 preferably includes suitable means well known to those skilled in the art for lifting, supporting, and lowering first carriage 21, such as a vertical rod 73 fixedly mounted at the lower end thereof to base plate 71 and extending upwardly through tube 51 to a suitable support well known to those skilled in the art at the upper end of first column 17, and preferably includes a hydraulic cylinder 75 fixedly mounted by suitable means to first carriage 21 for lifting, supporting and allowing the carriage to lower, by means well known to those skilled in the art. Thus, it will be understood rod 73 upon which is fixedly mounted the piston, not shown, in cylinder 75, is fixed and the cylinder 75 moves up and down relative to rod 73.

A suitable equalizer 77 well known to those skilled in the art is preferably provided between the tops of first and second columns 17, 19 to insure that the first and second lift arms 55, 57 associated with the first and second columns 17, 19 remain at the same level relative to each other. Suitable controls well known to those skilled in the art are provided for actuating the first and second power assemblies 29, 31 to raise, lower and hold support means 13 at any given position.

In the operation of vehicle lift 11, support means 13 is lowered in a manner well known to those skilled in the art to a position so that the first and second lift arm means 25, 27 can be positioned at the proper places in order to lift properly the vehicle. Then the control means, not shown, is actuated to lift the vehicle to the desired height for the repair and/or servicing thereof. Then when desired, the control means may be actuated to lower support means 13 and the vehicle thereon to the supporting surface S.

Figure 6:
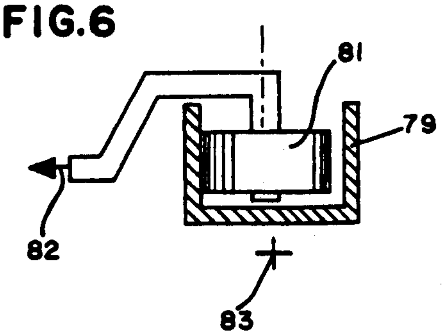
FIG. 6 is a diagrammatic view of a portion of a typical prior art vehicle lift illustrating the shear center problem in such a vehicle lift.

To understand more fully the balancing of the rotating effect of the follower means on the column means in the vehicle lift of the present invention as compared with the state of the art of a typical column used in present vehicle lifts in use, the following explanation is given in connection with FIG. 6.

FIG. 6 is a diagrammatic showing illustrating the problem involved when a single channel 79 is utilized as a vertical column in a vehicle lift. A roller 81, or if desired, a sliding block, movingly engages the channel. The load is shown by the arrow 82 on one of the upper set of rollers of a carriage, which load as will be seen extends horizontally inwardly in general towards the vehicle being lifted. The shear center 83 of channel 79 is located outside of the channel. As is well known to those skilled in the art, in a situation as shown in FIG. 6 where the load is not acting along a line extending through the shear center, but is acting off center from the shear center, there will be a counterclockwise torsional moment created and if large enough will cause the beam or channel to rotate and it is obvious that if sufficient rotation occurs, the roller will tend to disengage from the track with potentially disastrous results. In the prior art columns which utilize two rollers and a pair of inwardly facing channels which are joined together along one of the flanges thereof, the results are mitigated and a catastrophic failure is forestalled. However, due to track rotation, the rollers tend to engage the track surfaces on their corners damaging the track in the process due to high stresses created.

In contrast, the present invention overcomes the problems as follows. In FIG. 3 the shear center of first channel 39 is shown as at 85, the shear center of second channel 41 is shown as at 87 and the load is shown by the arrow as at 89. It can be seen by referring to FIG. 3 that the torsional moments produced due to shear center locations 85, 87 will substantially cancel one another. Further, second channel 41 serves to stiffen first channel 39 and lessen any tendency for first portion 33 to distort. It will be understood that the torsional moments produced due to shear center locations in second portion 35 will act in a similar manner to that above described and substantially cancel one another, and serve to stiffen first channel 39 of second portion 35 and lessen any tendency for the second portion 35 to distort. Also, in a similar manner the same explanation above described will apply to second column 19.

Although the present invention has been described and illustrated with respect to a preferred embodiment and a preferred use therefor, it is not to be so limited since modifications and changes can be made therein which are within the full intended scope of the invention.

I claim:

1. A vehicle lift comprising:

(a) support means for engaging a vehicle to be lifted, said support means including at least one carriage means and lift arm means, said carriage means including follower means;

(b) power means engaging said support means for lifting, supporting and lowering said support means to lift, support and lower a vehicle engaged by said support means; and (c) at least one vertically extending column means for supporting and guiding said support means during said lifting, supporting and lowering thereof; said column means including a pair of first channel means opening inwardly towards said carriage and a pair of second channel means respectively joined to said first channel means and respectively opening outwardly in the opposite direction from said pair of first channel means, and said pair of first channel means movably receiving said follower means.

2. The vehicle lift of claim 1 in which each of said first channel means includes an outer flange, an inner flange spaced from said outer flange, and a web integrally joining said inner and outer flanges; and in which each of said second channel means includes an outer flange, an inner flange spaced from said outer flange, and a web integrally joining said inner and outer flanges of said second channel means, said inner flange of one of said pair of first channel means and said inner flange of one of said pair of second channel means being integrally joined to establish an intermediate flange of said column means and said inner flange of the other of said pair of first channel means and said inner flange of the other of said pair of second channel means being integrally joined to establish another intermediate flange of said column means.

3. The vehicle lift of claim 2 in which said follower means includes an upper follower means and a lower follower means attached to one side of said carriage means with said lower follower means being spaced below said upper follower means; and an upper follower means and a lower follower means attached to the opposite side of said carriage means with said lower follower means being spaced below said upper follower means; and in which one of said pair of said first channel means movably receives said upper and lower follower means attached to said one side of said carriage means and said other of said pair of first channel means movably receives said upper and lower follower means attached to the opposite side of said carriage means; in which said pair of first channel means respectively have shear centers spaced outwardly from said first channel means; in which said carriage means applies a load through each of said upper follower means on said intermediate flange of each of said first channel means eccentric with respect to said shear centers of said first channel means tending to rotate each of said first channel means in one direction; and in which said pair of second channel means respectively have shear centers spaced inwardly from said second channel means at positions in which said load on said intermediate flange of each of said second channel means tends to rotate said second channel means in the opposite direction from said one direction substantially balancing the rotating effect of the shear load on said first channel means.

4. A vehicle lift comprising:

(a) support means for engaging a vehicle to be lifted, said support means including at least one carriage means and lift arm means, said carriage means including at least a pair of follower means;

(b) power means engaging said support means for lifting, supporting and lowering said support means to lift, support and lower a vehicle engaged by said support means; and (c) at least one vertically extending column means for supporting and guiding said support means during said lifting, supporting and lowering thereof; said column means including a first portion, a second portion spaced from said first portion and a back portion integrally joining said first and second portions, each of said first and second portions including a first channel means opening inwardly towards said carriage and a second channel means joined to said first channel means and opening outwardly in the opposite direction from said first channel means, said first channel means of said first and second portions being opposite and opening towards one another, said second channel means of said first and second portions being opposite and opening away from one another, said first channel means of said first and second portions respectively movably receiving said pair of said follower means.

5. The vehicle lift of claim 4 in which each of said first channel means includes an outer flange, an inner flange spaced from said outer flange, and a web integrally joining said inner and outer flanges; and in which each of said second channel means includes an outer flange, an inner flange spaced from said outer flange, and a web integrally joining said inner and outer flanges of said second channel means, said inner flanges of said first and second channel means of said first portion of said column being integrally joined to establish an intermediate flange, said inner flanges of said second portion of said column means being integrally joined to establish an intermediate flange, said outer flange of said first portion and said outer flange of said second portion being integrally joined to establish said back portion.

6. The vehicle lift of claim 5 in which said first channel means of each of said first and second portions has a shear center spaced outwardly from said first channel means; in which said carriage means applies a load through each of said follower means on said intermediate flanges of each of said first channel means eccentric with respect to said shear centers tending to rotate each of said first channel means in one direction, and in which said second channel means of each of said first and second portions has a shear center spaced inwardly from said second channel means at a position in which said load on said intermediate flange of each of said second channel means tends to rotate said second channel means in the opposite direction substantially balancing the rotating effect of the load on said first channel means.

7. The vehicle lift of claim 5 in which said carriage means includes at least four follower means including an upper follower means and a lower follower means attached to one side of said carriage means with said lower follower means being spaced below said upper follower means, and an upper follower means and a lower follower means attached to the opposite side of said carriage means with said lower follower means being spaced below said upper follower means, and in which said first channel means of said first portion slidably receives said upper and lower follower means attached to said one side of said carriage means and said first channel means of said second portion slidably receives said upper and lower follower means attached to the opposite side of said carriage means.

8. A vehicle lift comprising:

(a) support means for engaging a vehicle to be lifted, supported and lowered, said support means including a first carriage means and a second carriage means and first and second lift arm means respectively associated with said first and second carriage means, each of said carriage means including at least a pair of follower means;

(b) power means engaging said support means for lifting, supporting and lowering said support means to lift, support and lower a vehicle engaged by said support means; and (c) first vertically extending column means and second vertically extending column means respectively associated with said first and second carriage means for supporting and guiding said support means during said lifting, supporting and lowering thereof; each of said column means including a first portion, a second portion spaced from said first portion and a back portion integrally joining said first and second portions, each of said first and second portions including a first channel means, said first channel means of said first and second portions opening inwardly towards one another, and a second channel means joined to said first channel means and opening outwardly in the opposite direction from said first channel means, said first channel means of said first and second portions being opposite and opening towards one another, said second channel means of said first and second portions being opposite and opening away from one another; and said first channel means of said first and second portions respectively movably receiving said pair of said follower means.

9. The vehicle lift of claim 8 in which each of said first channel means includes an outer flange, an inner flange spaced from said outer flange, and a web integrally joining said inner and outer flanges; and in which each of said second channel means includes an outer flange, an inner flange spaced from said outer flange, and a web integrally joining said inner and outer flanges of said second channel means, said inner flanges of said first and second channel means of said first portion of each of said said column means being integrally joined to establish an intermediate flange, said inner flanges of said second portion of each of said column means being integrally joined to establish an intermediate flange, said outer flange of said first channel means of said first portion of each of said column means and said outer flange of said first channel means of said second portion of each of said column means being integrally joined to establish said back portions of each of said column means.

10. The vehicle lift of claim 9 in which each of said carriage means includes at least four follower means including an upper follower means and a lower follower means attached to one side of said each of said carriage means with said lower follower means being spaced below said upper follower means; and an upper follower means and a lower follower means attached to the opposite side of said carriage means with said lower follower means being spaced below said upper follower means; and in which said first channel means of said first portion of each of said column means associated therewith movably receives said upper and lower follower means attached to said one side of said carriage means and said first channel means of said second portion of each of said column means associated therewith movably receives said upper and lower follower means attached to the opposite side of said carriage means.

11. The vehicle lift of claim 10 in which in each of said first and second columns said first channel means of each of said first and second portions has a shear center spaced outwardly from said first channel means; in which said carriage means applies a load through each of said upper follower means on said intermediate flanges of each of said first channel means eccentric with respect to said shear centers tending to rotate each of said first channel means in one direction, and in which said second channel means of each of said first and second portions has a shear center spaced inwardly from said second channel means at a position in which said load on said second channel means of each of said second channel means tends to rotate said second channel means in the opposite direction substantially balancing the rotating effect of the load on said first channel means.

* * * * *